G. WATT.
Whiffletree.
No 57,801.
Patented Sept. 4, 1866.
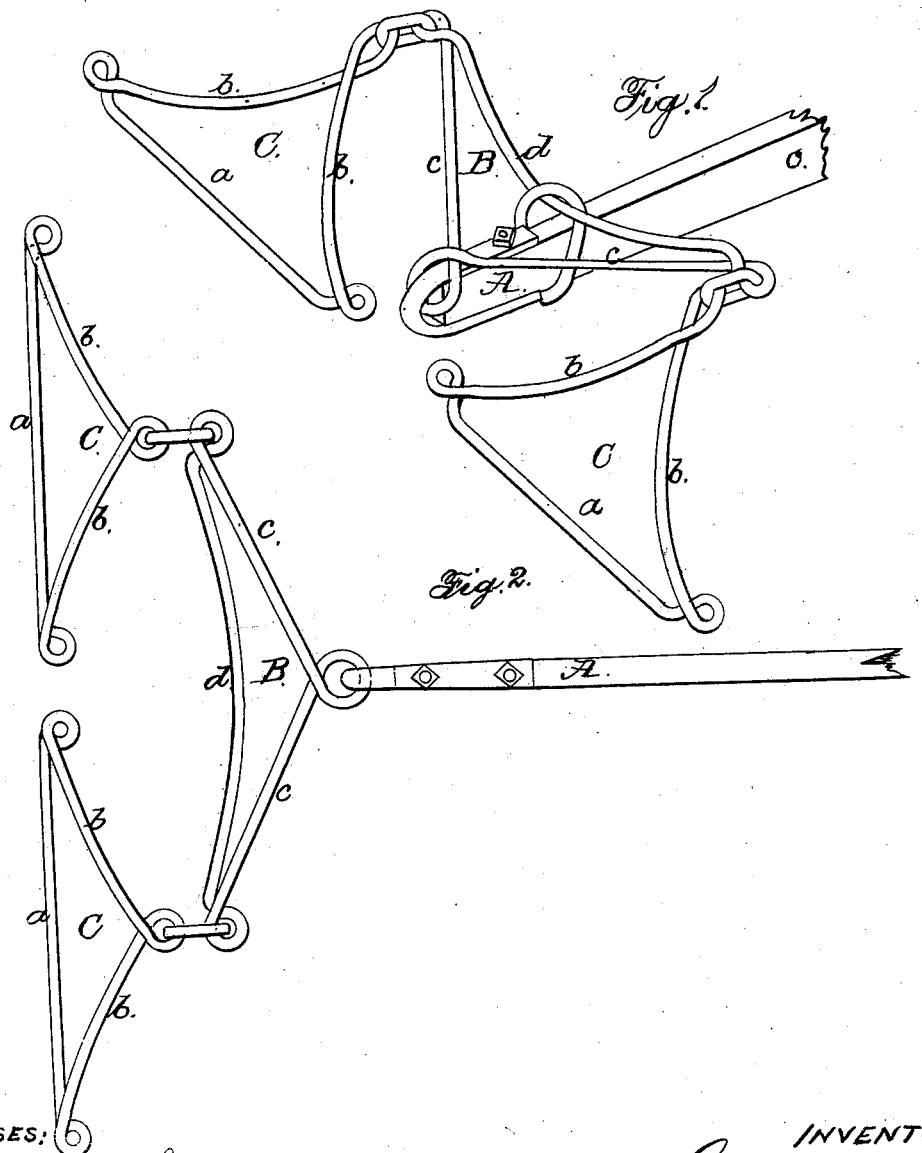
WITNESSES:
INVENTOR:
George Watt,

UNITED STATES PATENT OFFICE.

GEORGE WATT, OF RICHMOND, VIRGINIA.

IMPROVEMENT IN WHIFFLETREES.

Specification forming part of Letters Patent No. 57,801, dated September 4, 1866.

*To all whom it may concern:*

Be it known that I, GEORGE WATT, of Richmond, in the county of Henrico and State of Virginia, have made new and useful Improvements in Whiffletrees; and I do hereby declare the following to be a full, clear, and exact description of the nature, construction, and operation of the invention, sufficient to enable one skilled in the art to which it appertains to construct and use the same, reference being had to the accompanying drawing, which is made part of this specification, and in which my improvement is represented by a perspective view.

The improvement consists in making the double and single trees of rods so fashioned by the bending of one or more portions as to have an elasticity when power is applied to the ends and the middle loop held fast.

It also consists in the manner of attaching the double-tree to the plow-beam so as to bring the team nearer to their work.

The advantage of the latter is admitted by teamsters, and the benefit of the spring consists in relieving the team and the plow from the shock produced by contact with a solid substance, such as a stump, green root, or a sunken rock. The casualties resulting from these jerks are jammed shoulders, ruptured gears, and broken whiffletrees.

In the drawing, A represents the end of a plow-beam; B, the double-tree, and C C the single-trees. The trees are made of iron rod bent into a triangular shape, with loops at the end and middle for the purpose of attachment. The double-tree is attached by its middle loop to the plow-clevis, and by its ends to the middle loops of the single-trees, whose end loops afford means for the attachment of the traces by hooks fastened to the said loops, or by hooks on the traces, the variation in the mode of attachment being a matter perfectly familiar to experts and immaterial to the case in hand.

It will be seen that the rod forming the longest side of the double-tree is bent, and that the rods forming the shorter sides of the single-trees are also bent, so as to afford a spring. When they are all in the position shown in the drawing the rods $a\ a$ of the single-trees form spreader-bars, and by draft on the end the rods $b$ are partially straightened, resuming their normal bent position when the strain is withdrawn.

In the double-tree the straight rods $c\ c$ form a spreader, and the bent rod $d$ is straightened by draft upon the single-trees.

The double-tree may hang at the end of the plow-beam in the usual manner, or it may be folded back, as shown in the drawing, and retained by a ring. In the latter case the team may be hitched nearer to the mold-board by about double the height of the triangle formed by the double-tree. This is an important consideration.

Having described my invention, what I claim therein as new, and desire to secure by Letters Patent, is—

1. The construction of a double, single, or treble tree so that it, by means of one or more of its bent sides, shall form an elastic connection between the draft-animal and the object, (wagon, plow, &c.,) as described.

2. The attachment of the double-tree by its longest side to the plow-beam, as and for the purpose described.

To the above specification of improvement in whiffletrees I have signed my hand this 25th day of May, 1866.

GEO. WATT.

Witnesses:
ALEXR. A. C. KLAUCKE,
JOHN A. WIEDERSHEIM.